US007096419B2

(12) United States Patent
Barnes et al.

(10) Patent No.: US 7,096,419 B2
(45) Date of Patent: Aug. 22, 2006

(54) SYSTEM AND METHOD FOR OBJECT STATE PERSISTENCE

(75) Inventors: Christine Michelle Barnes, Morrisville, NC (US); Charles Richard Main, Morrisville, NC (US)

(73) Assignee: SAS Institute Inc., Cary, NC (US)

(*) Notice: Subject to any disclaimer, the term of this patent is extended or adjusted under 35 U.S.C. 154(b) by 512 days.

(21) Appl. No.: 09/785,625

(22) Filed: Feb. 16, 2001

(65) Prior Publication Data

US 2002/0116412 A1 Aug. 22, 2002

(51) Int. Cl.
*G06F 9/44* (2006.01)

(52) U.S. Cl. ...................... 715/513; 717/116; 717/108; 717/100

(58) Field of Classification Search ........ 717/100–178; 707/102, 10, 103 R; 709/202, 225
See application file for complete search history.

(56) References Cited

U.S. PATENT DOCUMENTS 5,944,781 A * 8/1999 Murray ....................... 709/202
6,301,585 B1 * 10/2001 Milne ..................... 707/103 R
6,578,192 B1 * 6/2003 Boehme et al. ............. 717/115
6,606,632 B1 * 8/2003 Saulpaugh et al. ......... 707/102
6,609,130 B1 * 8/2003 Saulpaugh et al. ......... 707/102
6,643,652 B1 * 11/2003 Helgeson et al. ............. 707/10
2002/0032775 A1 * 3/2002 Venkataramaiah et al. .. 709/225

OTHER PUBLICATIONS

Johnson, Process XML with JavaBeans, Part 1-3, Nov. 1999-Jan. 2000.*
Johnson, XML JavaBeans, Part 1-3, Feb. 1999-Jul. 1999, JavaWorld.*
Bosak, XML, Java, and the future of the Web, Mar. 10, 1997, Sun.*
Sall, XML and Java: Why These Two, Nov. 16, 1998, Web developer's virtual library.*
Westphal, Using XML for Object Persistence, Sep. 1999, XML.com.*
Milne et al., Long-Term Persistence for JavaBeans, Nov. 1999-Jan. 19, 2001.*
JSX: Java Serialization to XML, Macmillan, Oct. 23, 2000.*
JSX History, Oct. 2000 to Jan. 19, 2001.*
JSX History, Oct. 2000-Jan. 19, 2001.*

* cited by examiner

*Primary Examiner*—Kakali Caki
*Assistant Examiner*—Insun Kang
(74) *Attorney, Agent, or Firm*—Jones Day

(57) ABSTRACT

A computer-implemented method and system for persisting public and private object state data created within an object development environment. A node tree is generated whose nodes store the public and private object state data. The nodes of the node tree are used to generate nodes in an XML tree such that the nodes in the XML tree correspond to an XML tag structure. XML tags are generated based upon the nodes in the XML tree and are structured so as to persist the public and private object state data.

36 Claims, 19 Drawing Sheets

MATCH TO FIG.3B

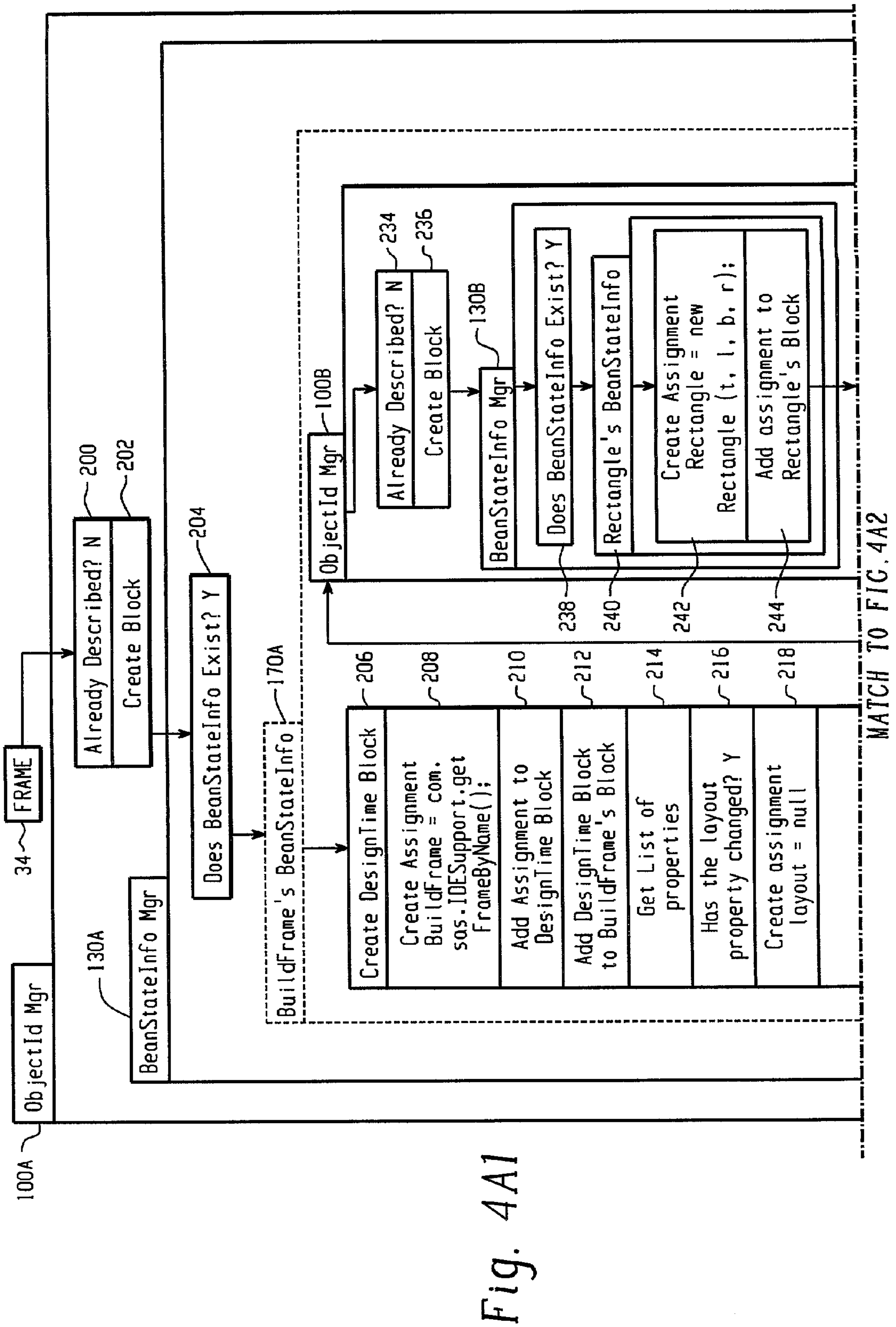
Fig. 4A1

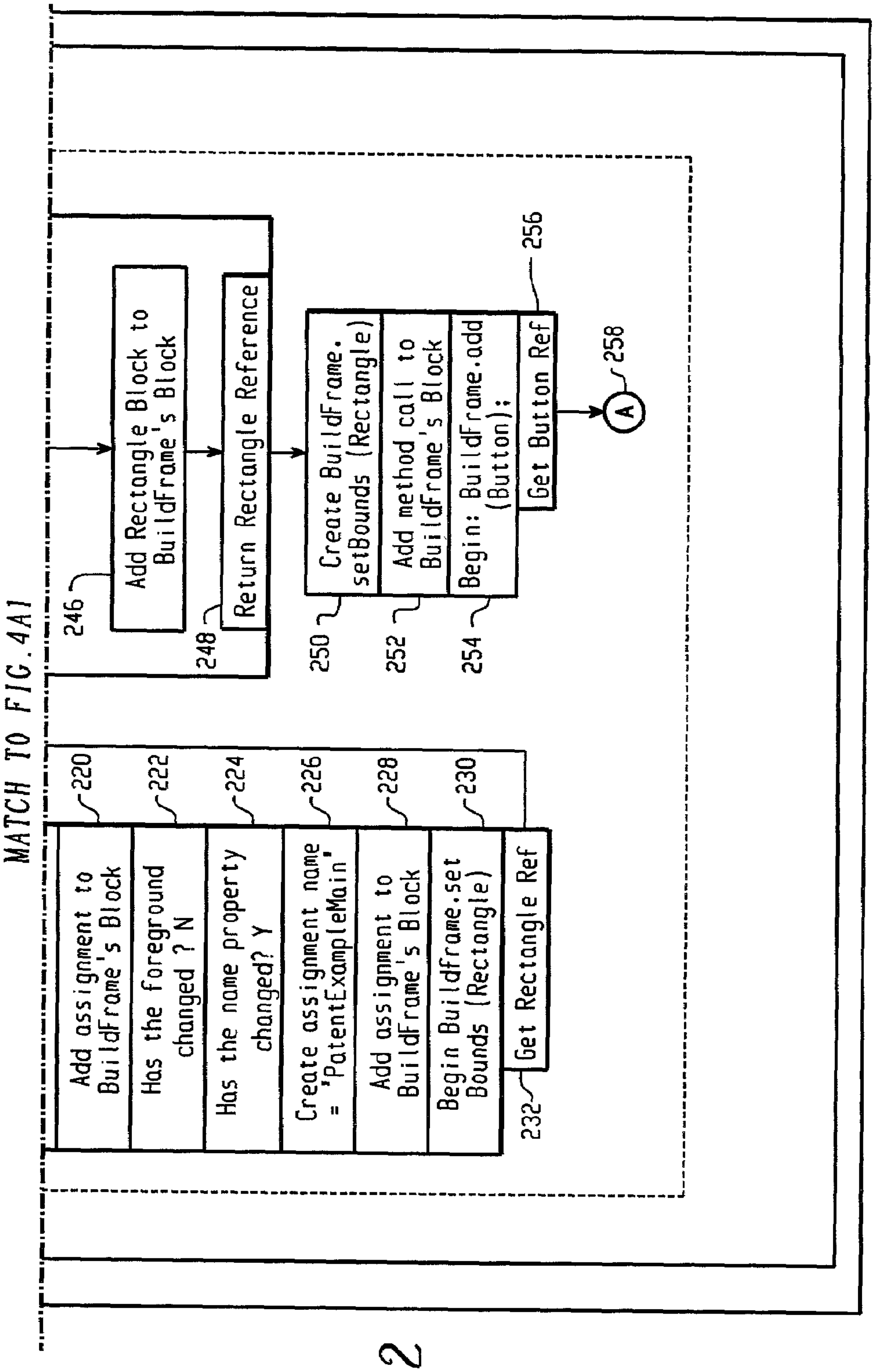
Fig. 4A2

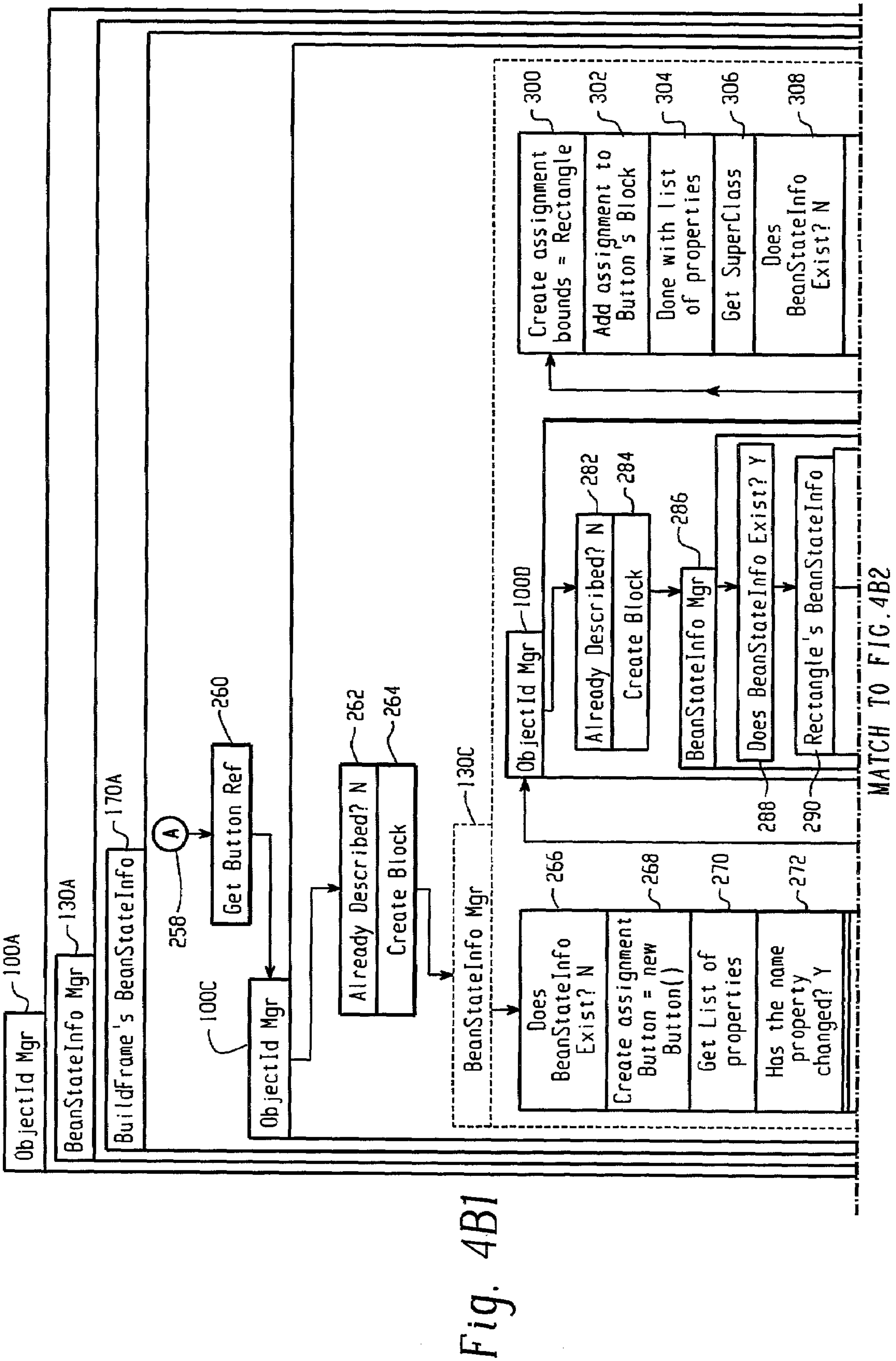
Fig. 4B1

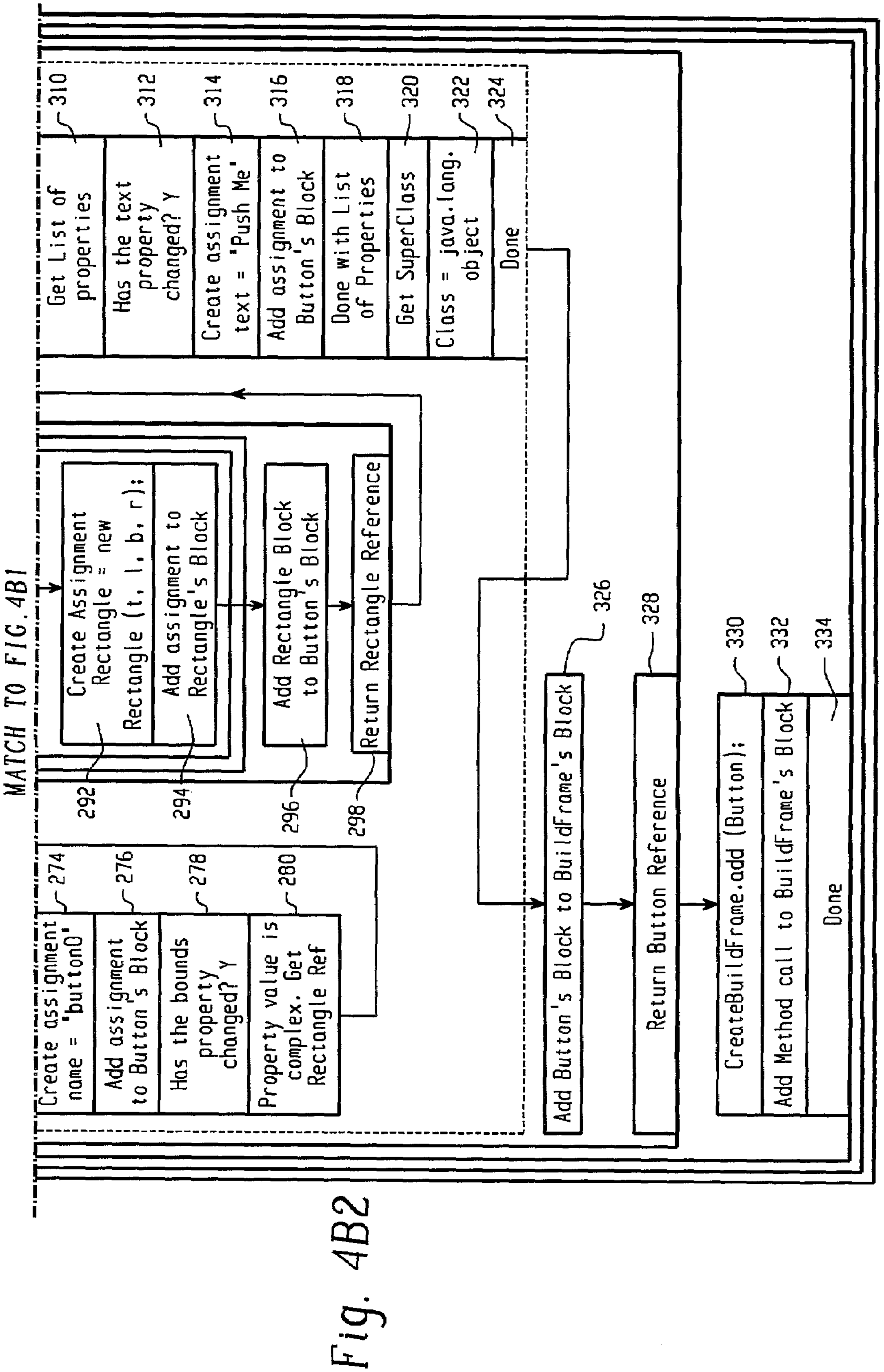
Fig. 4B2

MATCH TO FIG.5B

MATCH TO FIG.5A

MATCH TO FIG.5C

```
400  <block id = '1'>
402  <designTimeBlock>
406   <assignment>
408    <object class = 'com.sas.ide.BuildFrame' id = '1'/>
410    <method name = 'getFrameByName' returns ='java.lang.Object'>
412     <class name = 'com.sas.ide.IDESupport'/>
414     <argumentList>
416      <parameter type = 'jave.lang.String'>
          <string value = 'patentExampleMain'/>
         </parameter>
        </argumentList>
       </method>
      </assignment>
404  </designTimeBlock>
420  <assignment>
      <property name = 'layout' type = 'jave.awt.LayoutManager'>
       <object class = 'com.sas.ide.BuildFrame' id = '1'/>
      </property>
      <null/>
     </assignment>
422  <assignment>
      <property name = 'name' type = 'java.lang.String'>
       <object class = 'com.sas.ide.BuildFrame' id = '1'/>
      </property>
      <string value = 'patentExampleMain'/>
     <assignment>
424  <block id = '6'>
     <assignment>
      <object class = 'java.awt.Rectangle' id ='6'/>
      <new type = 'java.awt.Rectangle'>
       <argumentList>
        <parameter type = 'int'>
         <int<0>/int>
        </parameter>
        <parameter type = 'int'>
         <int>0</int>
        </parameter>
        <parameter type = 'int'>
         <int>336</int>
        </parameter>
        <parameter type = 'int'>
```

MATCH TO FIG. 6B

MATCH TO FIG.6A

```
    <int>93</int>
   </parameter>
  </argument list>
 </new>
</assignment>

</block>

<method name = 'setBounds' returns = 'void'>          426
 <object class = 'com.sas.ide.BuildFrame' id = '1'/>
 <argumentList>
  <parameter type = 'jave.awt.Rectangle'>
   <object class = java.awt.Rectangle' id = '6'/>
  </parameter>
 </arguementList>
</method>

<block id = '7'>                                      428

 <assignment>
  <object class = 'com.sas.awt.Button' id = '7'/>
  <new type = 'com.sas.awt.Button'>
   <argumentList/>
  <new/>
 <assignment/>

 <assignment>
  <property name = 'name' type = 'java.lang.String'>
   <object class = 'com.sas.awt.Button' id = '7'/>
  </property>
  <string value = 'button0'/>
 <assignment/>

<block id '8'>
 <assignment>
  <object class = 'java.awt.Rectangle' id = '8'/>
  <new type = 'java.awt.Rectangle'>
   <argumentList>
    <parameter type 'int'>
     <int>14</int>
```

MATCH TO FIG.6C

Fig. 6B

MATCH TO FIG.6B

```
    </parameter>
    <parameter type 'int'>
     <int>33</int>
    </parameter>
    <parameter type 'int'>
     <int>75</int>
    </parameter>
    <parameter type 'int'>
     <int>23</int>
    </parameter>
   </argumentList>
  </new>
 </assignment>
</block>
```

```
<method name = 'setBounds' returns = 'void'>
 <object class = 'com.sas.awt.Button' id = '7'/>
 <argumentList>
  <parameter type = 'com.sas.awt.Rectangle'>
   <object class = 'java.awt.Rectangle' id = '8'/>
  </parameter>
 </argumentList>
</method>
```

```
</assignment>
 <property name = 'text' type = 'java.lang.String'>
  <object class = 'com.sas.awt.Button' id = '7'/>
 </property>
 <string value = 'Push Me'/>
</assignment>
```

```
</block>
```

430

```
<method name = 'add' returns = 'java.awt.Component'>
 <object class = 'com.sas.ide.BuildFrame' id = '1'/>
 <argumentList>
  <parameter type = 'java.awt.Component'>
   <object class = 'com.sas.awt.Button' id = '7'/>
  </parameter>
 </argumentList>
</method>
```

```
</block>
```

Fig. 6C

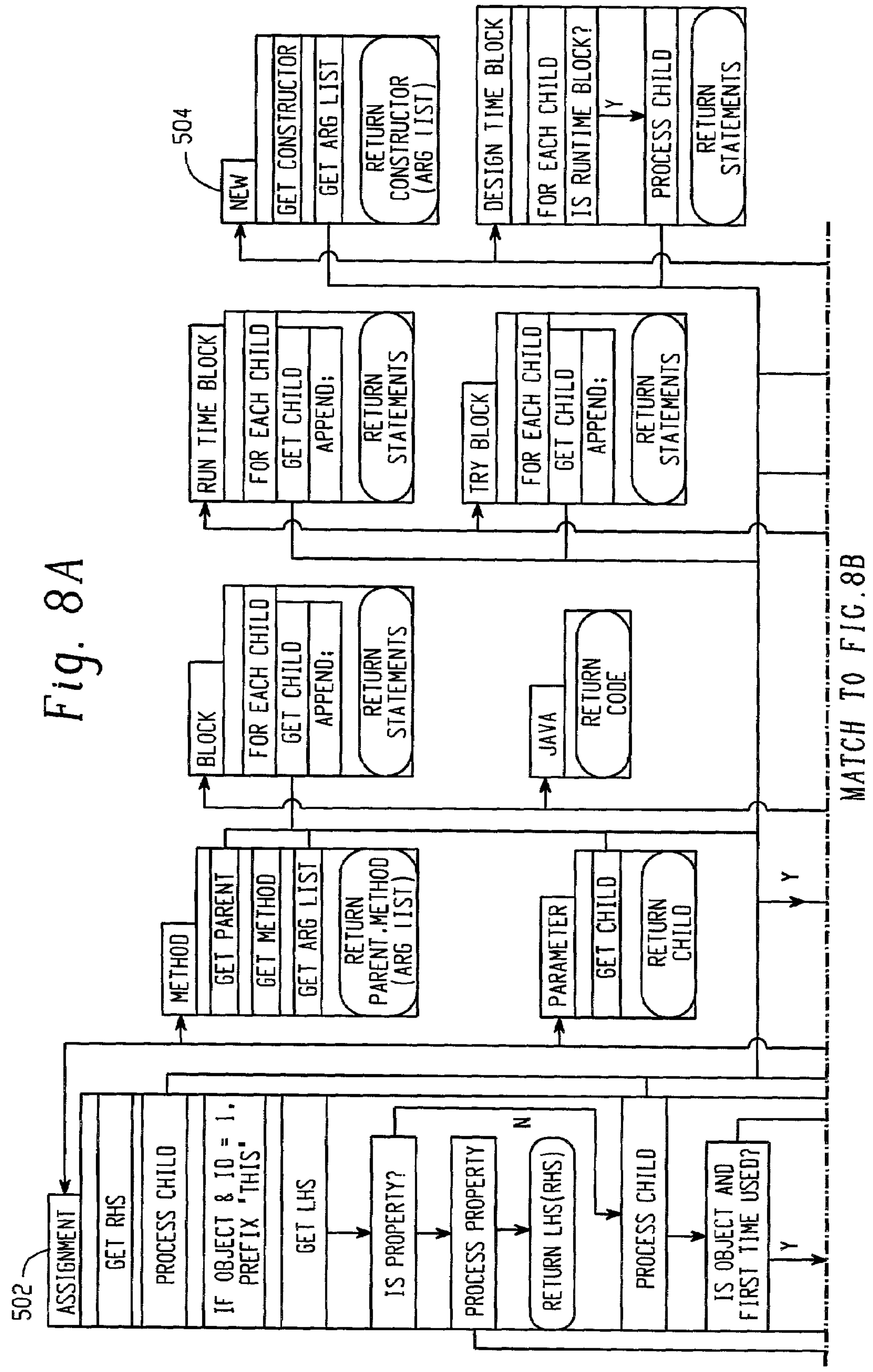

*Fig. 8A*

502 — ASSIGNMENT
- GET RHS
- PROCESS CHILD
- IF OBJECT & ID = 1, PREFIX "THIS"
- GET LHS →
- IS PROPERTY? — N
- PROCESS PROPERTY
- RETURN LHS(RHS)
- PROCESS CHILD
- IS OBJECT AND FIRST TIME USED? — Y

METHOD
- GET PARENT
- GET METHOD
- GET ARG LIST
- RETURN PARENT.METHOD (ARG LIST)

PARAMETER
- GET CHILD
- RETURN CHILD

BLOCK
- FOR EACH CHILD
- GET CHILD
- APPEND;
- RETURN STATEMENTS

JAVA
- RETURN CODE

RUN TIME BLOCK
- FOR EACH CHILD
- GET CHILD
- APPEND;
- RETURN STATEMENTS

TRY BLOCK
- FOR EACH CHILD
- GET CHILD
- APPEND;
- RETURN STATEMENTS

504 — NEW
- GET CONSTRUCTOR
- GET ARG LIST
- RETURN CONSTRUCTOR (ARG LIST)

DESIGN TIME BLOCK
- FOR EACH CHILD
- IS RUNTIME BLOCK? — Y
- PROCESS CHILD
- RETURN STATEMENTS

MATCH TO FIG. 8B

SYSTEM AND METHOD FOR OBJECT STATE PERSISTENCE

BACKGROUND

1. Technical Field

The present invention is generally directed to object-oriented programming languages, and more specifically to the field of object-oriented software development.

2. Description of Related Art

In computer software development, it is important to be able to save and restore the state of the developed applications as those applications are programmed, tested and debugged. Developers of Java® create computer software component technology called JavaBeans® using the specification set forth by Sun Microsystems, Inc., Palo Alto, Calif. The JavaBeans specification describes a technique called "serialization" to save and restore component state of a JavaBean during development. According to the JavaBeans specification, the act of serialization is delegated to the JavaBean itself.

Java development environments that comply with the JavaBeans standard, for example AppDev Studio from SAS Institute Inc., Cary, N.C., require a robust technique for saving the state of the developed applications. Because these development environments are tools for wiring together JavaBeans components, serializing a given application's project state involves serialization requests to the JavaBeans themselves.

A problem with the current JavaBeans serialization model is that it does not provide appropriate hooks for error recovery and is stored in a binary format which is not effectively understandable by a component designer. If a particular JavaBean cannot be instantiated to restore the state of a saved project, the project cannot be opened. If the serialization file is corrupted in any manner or the serialization format changes because of an update to a particular JavaBean, no matter how minor, serialization halts without any chance of recovery. Such limitations are clearly not acceptable in a project development environment. JavaBeans under development will change quite regularly and an application development tools must be expressly designed to handle such occurrences.

Sun Microsystems has recognized this problem and have attempted to overcome this problem in several ways through its more recent software releases. However, Sun Microsystems' approach only allows for the serialization of the public state of an object (that state which can be queried or set via public method calls or public fields). This is insufficient as many objects contain internal states that must be captured in order to properly restore them at runtime.

Moreover, the implementation of Sun Microsystems does not allow objects to specify the order in which their state is restored. This can lead to errors at runtime where several values have interdependencies. Consider an object in a frame with a particular property whose value is bounded by two of the object's other properties. Such an object may be used in a frame that has been developed with a web development software package, (e.g., WebAF from SAS Institute Inc., Cary, N.C.). The frame may include in its graphical user interface (GUI) a spin control that a user increments or decrements to a desired value. The spin control is an object with a particular property whose value is bounded by two of the object's other properties. The "count" property of the spin control is bounded by its associated "minCount" and "maxCount" properties. If the boundary parameters are not set before the bound value, an invalid state could result during object restoration, resulting in a runtime error.

IBM, from Armonk, N.Y., has developed a technology called Bean Markup Language (BML) that uses an XML (extensible Markup Language) format to save application state. This XML state is then used by a runtime interpreter to instantiate the application and "play it back". An analogy would be a streaming audio format that can only be played back with a proprietary "player". The IBM approach has the same shortcomings as the approach of Sun Microsystems. It also requires that a runtime player be installed on all client machines that intend to play back the application. The BML player uses a Java technology called "reflection" during runtime playback of the BML file. This results in significant performance degradation. Finally, BML is not Java code, and many end users expect to see and use the Java code produced by the development environment.

Other Java development environment producers use straight code generation to save Java component state (i.e., they do not use JavaBeans serialization in any form). This somewhat limits the set of components that they can interact with and the interactions that can be performed such that the state can be correctly saved. For example, any component that relies on non-public methods or fields to capture state cannot be manipulated by such a tool. Additionally, JavaBeans customizers, which provide a user-friendly way for customizing the state of a JavaBeans component, rely on JavaBeans serialization and thus cannot be used in such an environment.

SUMMARY

The present invention solves the aforementioned disadvantages as well as other disadvantages. In accordance with the teachings of the present invention, a computer-implemented method and system are provided for persisting public and private object state data created within an object development environment. A node tree is generated whose nodes store the public and private object state data. The nodes of the node tree are used to generate nodes in an XML tree such that the nodes in the XML tree correspond to an XML tag structure. XML tags are generated based upon the nodes in the XML tree and are structured so as to persist the public and private object state data.

With such a system and method, the present invention supports design time serialization of JavaBeans in an application builder as well as handling both public and private state of the JavaBeans. It allows for customization hooks so that JavaBeans may control the code that is generated to restore their state. In addition to still other advantages, the present invention integrates with a back-end code generator so that no runtime player is required to execute the resulting application.

BRIEF DESCRIPTION OF THE DRAWINGS

FIGS. 4A1–4B2 are object flow diagrams that depict an example of creating beanstate information from objects within a frame;

FIGS. 6A–6C depict XML code that corresponds to the nodes of the XML tree diagrams in FIGS. 5A–5C;

FIGS. 8A and 8B are flow diagrams that depict processor objects used to translate an XML tree into source code.

DETAILED DESCRIPTION OF THE PREFERRED EMBODIMENT

Figure 1A:
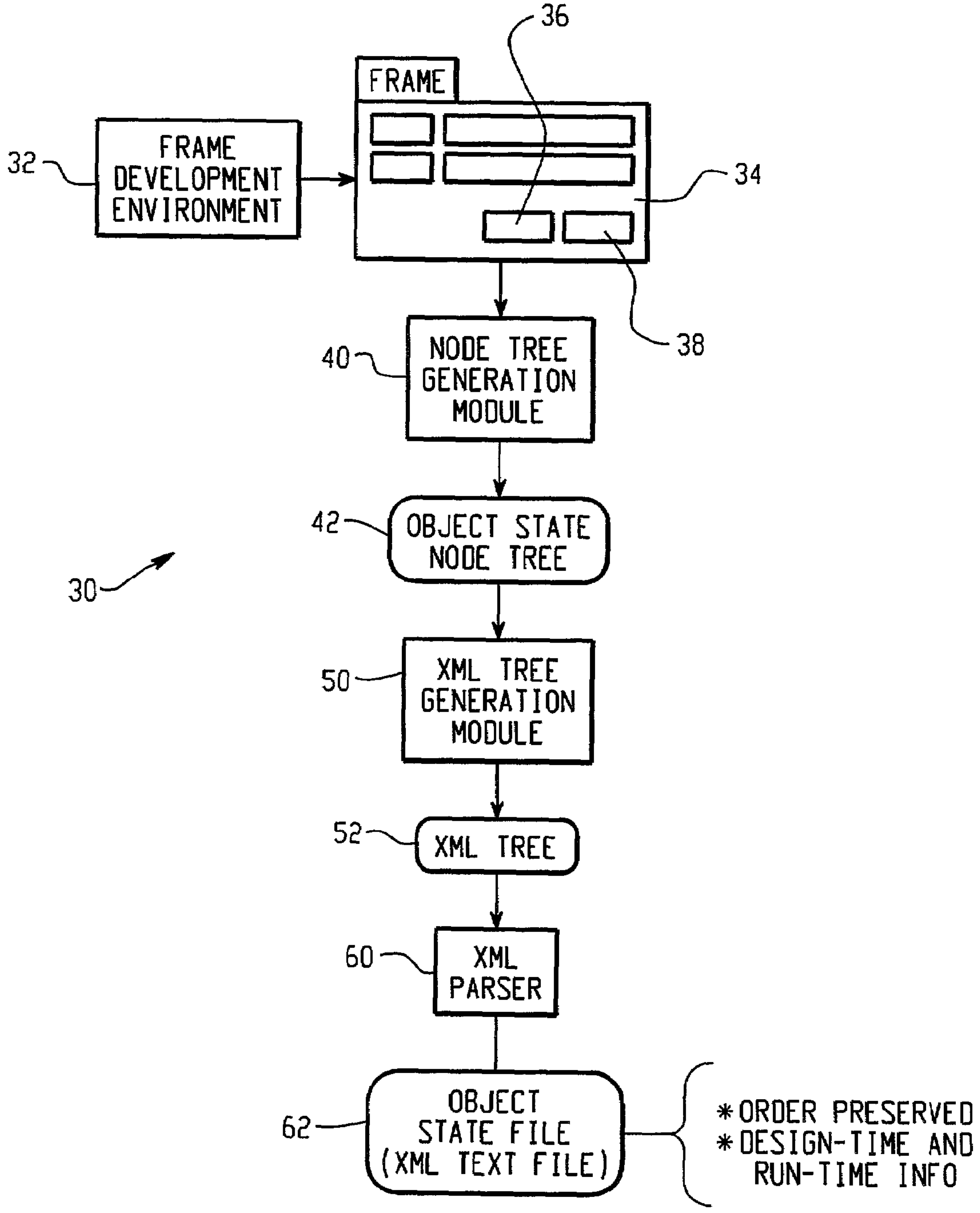
FIGS. 1A and 1B are system block diagrams that depict the capturing and restoring of object state information in accordance with the teachings of the present invention.
Figure 1B:
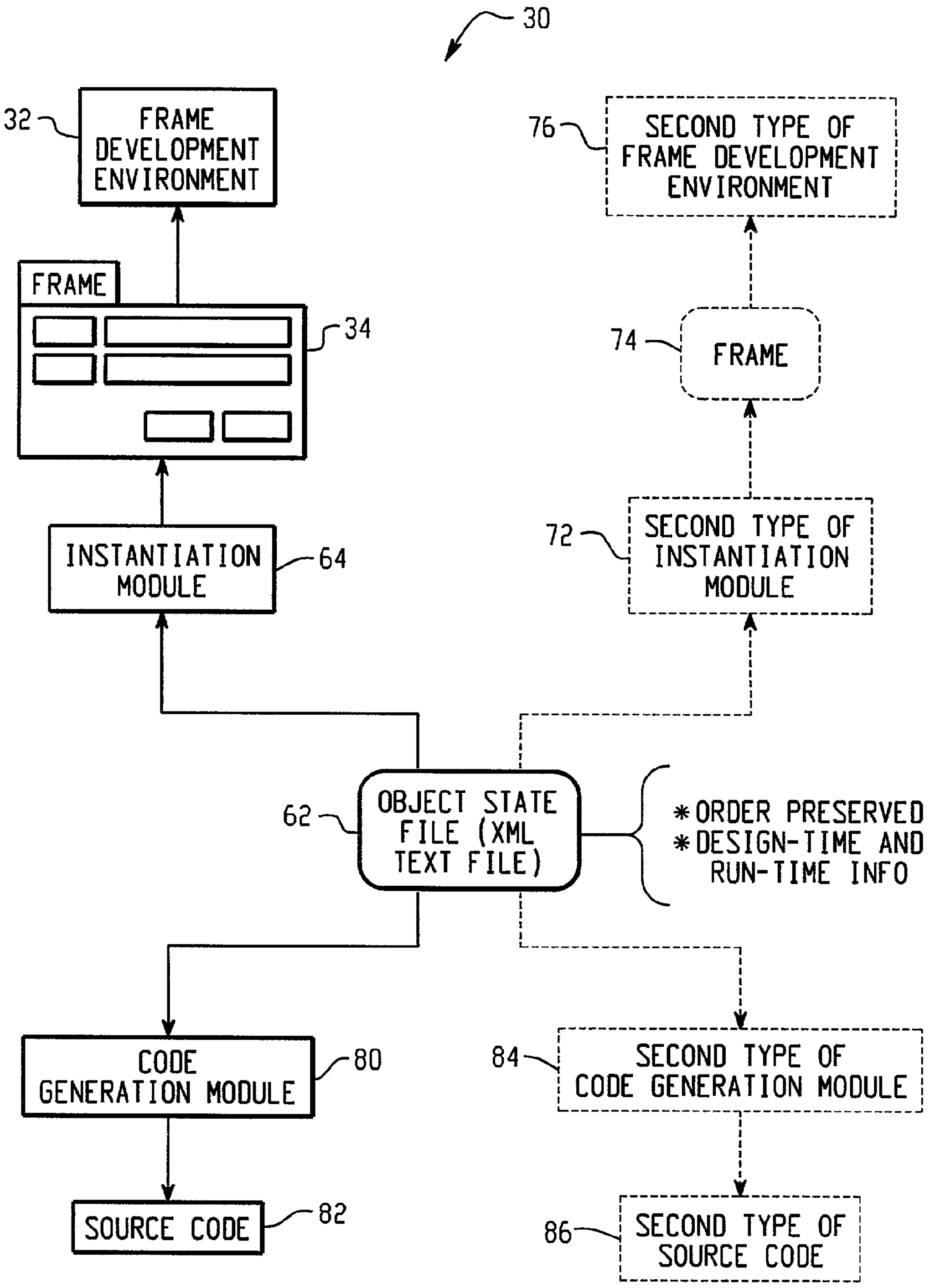

FIGS. 1A and 1B are system block diagrams that depict the capturing and restoring of object state information in accordance with the teachings of the present invention. With reference to FIG. 1A, the system 30 of the present invention provides for the preservation of state information for objects that are being developed within a software development environment 32. The system 30 analyzes and preserves the state of objects used within the frame development environment 32.

Within the frame development environment 32, frame 34 uses objects, such as JavaBeans, to provide a graphical user interface (GUI) for display and manipulation by a user. For example, frame 34 may include a spin control 36 that a user increments or decrements to a desired value. The spin control 36 may be used by the user to specify the user's age. Frame 34 may also include a button 38 that a user presses when the spin control 38 displays a value acceptable to the user.

The present invention uses a node tree generation module 40 to generate an object state node tree 42 that captures state information of objects used within the frame 34. The node tree generation module 40 constructs the object state node tree 42 so as to specify the order in which the objects' states are restored. In this way for example, the present invention allows the spin control's parameters to be later reconstructed in an order that sets the boundary parameters before the bound value, thereby eliminating a possible runtime error. Moreover, the present invention allows the saving of private object state data as well as public object state data. The public and private state data is stored with the bean state nodes. The present invention uses public methods, public fields and/or public properties to restore an object's private state data for subsequent use in a development environment or source code. For example, an object may have as private data what its layout default value should be at run time. This object state data is captured and restored by the present invention.

The beanstate node tree 42 is converted into an XML tree 52 by an XML tree generation module 50. Module 50 relies upon each BeanState node knowing how to write itself as XML. Each Beanstate Node is visited in order to create the XML tree 52. Once the XML tree 52 has been created, the XML tree 52 is traversed and written as a text file 62 by a commercially available XML parser 60. In this way, the data is persisted. The resulting file 62 contains the object state information in an XML tagged format. The XML tagged format fully specifies the public and private states of the objects contained in the frame 34 as well as the order of restoration.

The persistence of object state data in a human-understandable format (such as a text human-readable format) allows a component designer to modify object structures (such as object classes) outside of the development environment through a wide range of techniques. For example, the component designer may directly edit the file to alter the object structure or use different file editors (e.g., XML parsing mechanisms) to alter the object structure. The component designer can more easily correct errors or update object structures without having to reenter the development environment. If the data were persisted in a proprietary binary format as in the current approaches, the component designer would have few if any alternatives in modifying the object structure outside of the development environment. Moreover, it should be understood that the present invention is not limited to storing object state data in an XML format, but includes any structured format that allows the storing of object state data with the ability to specify a restoration order.

Figure 2:
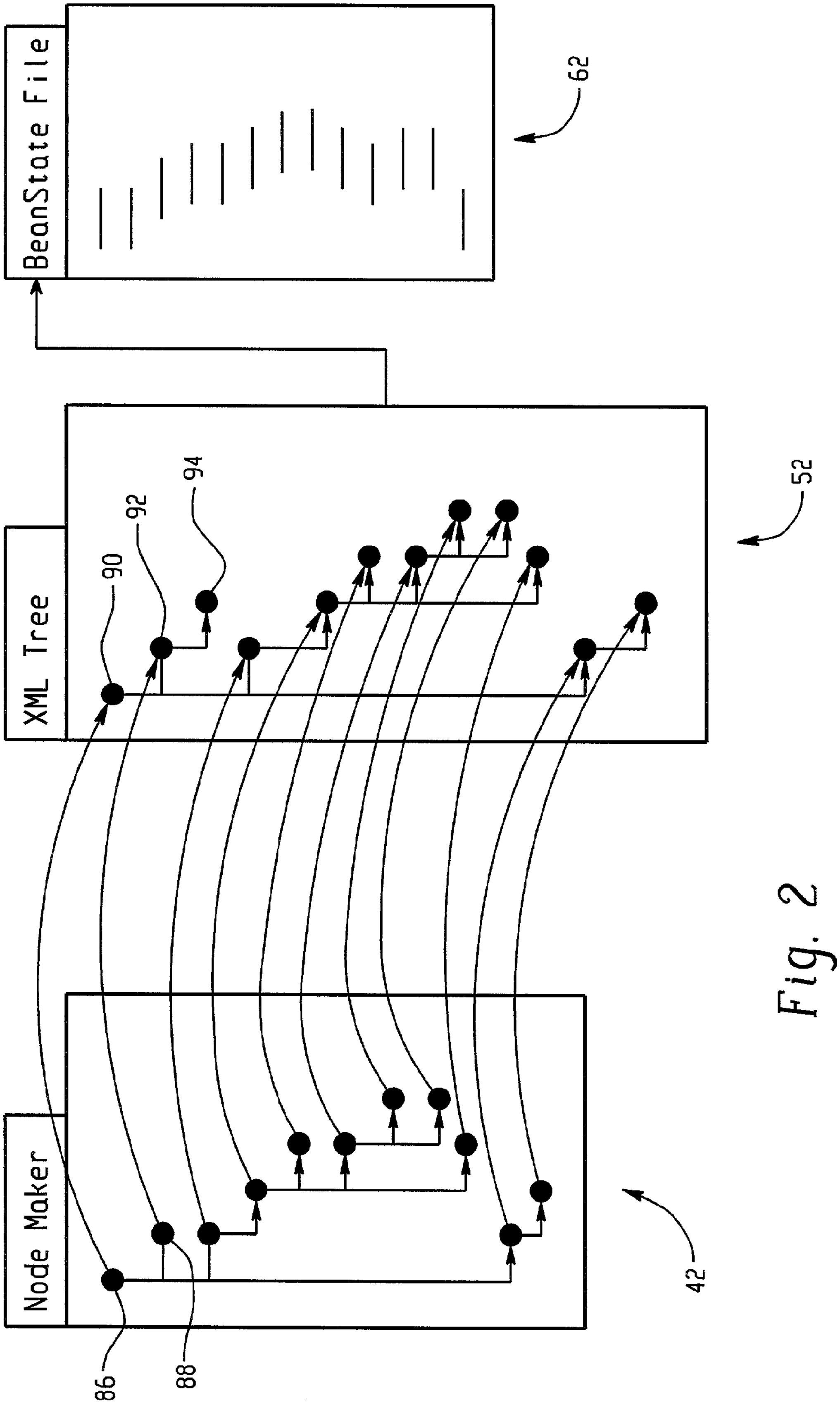
FIG. 2 is a flow diagram that depicts the creation of the beanstate file from an XML tree and beanstate information.

The creation of an object (JavaBean) state file 62 from an XML tree 52 and an object state node tree 42 is graphically depicted in FIG. 2. With reference to FIG. 2, each node in the object state node tree 42 writes itself as a node on the XML tree 52 after the object state node tree 42 has been created. Node 86 on object state node tree 42 represents the root node of the tree. For a frame, the root node 86 may be a BuildFrame node whose children specify properties and methods for reconstructing the frame. A child node of root node 86 may be an assignment node 88 which indicates that a property of the frame has a certain value. For example, the layout property of the frame may be assigned the value of null in order to represent its value in the development environment. Other types of children nodes include method nodes, design time nodes, constructor nodes, etc.

Each of the nodes in the object state node tree 42 is processed to form nodes of an XML tree 52. In the above example, root node 86 is a BuildFrame node which is translated into an XML block node 90. XML children nodes are created in a manner that allows XML tags to be directly generated for each of the children nodes. For example, the a constructor object state node 88 may be directly written as the two XML children nodes 92 and 94. The constructor object state node 88 may write a "new" tag, as well as an "argumentList" tag in order to express itself as XML (note: the constructor's "new" and "argumentList" tags are also exemplified on FIG. 5A under the rectangle block node 374). Thus, the structure of the object state node tree 42 may differ from the structure of the XML tree 52 due to the tagging format of XML. Once the XML tree 52 has been created, the XML tree 52 is traversed and written as an XML tagged bean state file 62 by an XML parser.

FIG. 1B depicts the many different uses of the present invention in restoring and using the objects specified in the object state file 62 (i.e., the XML tagged text file). For example, the object state file 62 may restore the objects for use in the frame development environment 32. To accomplish this, an instantiation module 64 reads the XML tags stored in the object state file 62 and instantiates objects to recreate frame 34 within the environment 32. Since the present invention uses XML to preserve the object state information, other types of instantiation modules may be used. For example, a second type of instantiation module 72 may instantiate frame 34 so as to be used within a frame development environment other than environment 32.

The object state file 62 may also be used to directly generate source code (i.e., for use and execution outside the development environment). Code generation module 80 reads the XML tags in the object state file 62 in order to convert the stored XML tags into source code 82, such as Java source code. Since the present invention uses XML to preserve the object state information, other types of source code may be generated. For example, a different code generation module may convert the XML tags into source code other than Java source code.

Figure 3A:
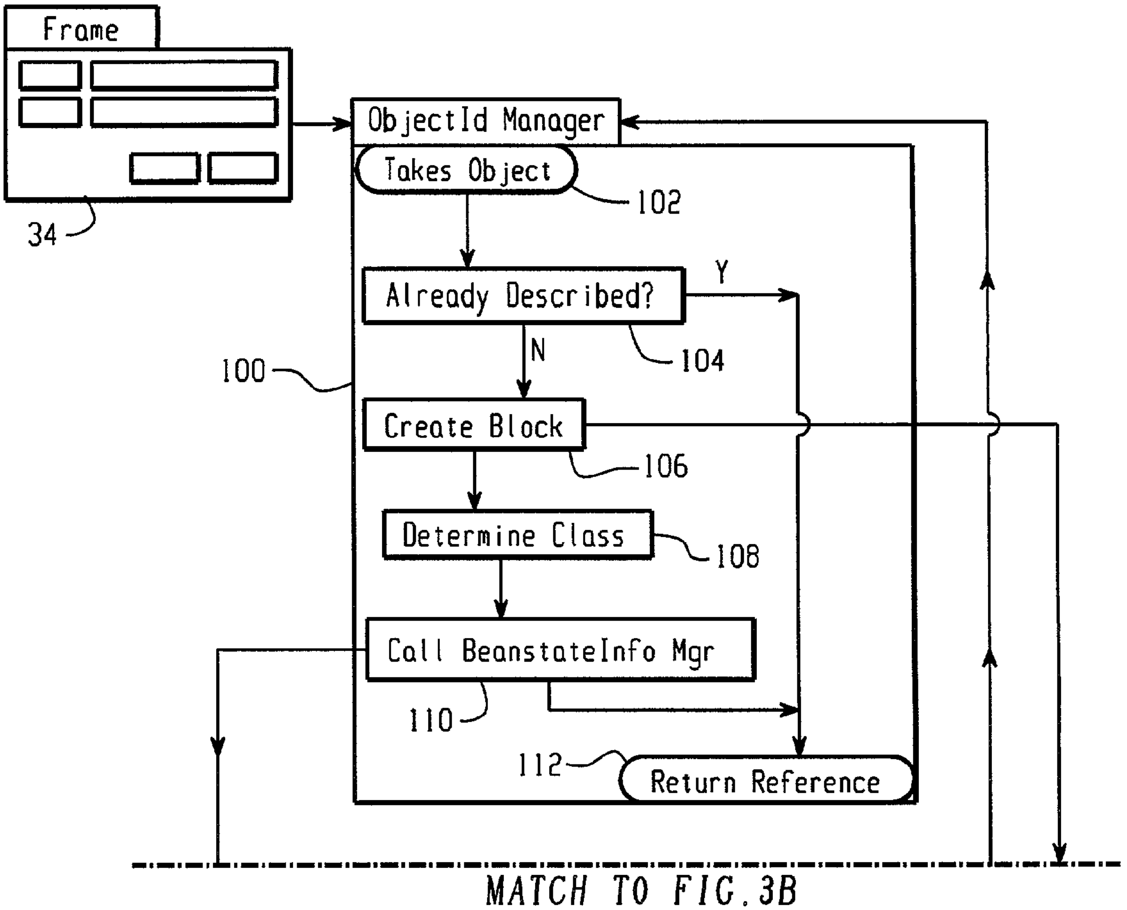
FIGS. 3A and 3B are flow diagrams that depict objects used to capture state information of frame objects.
Figure 3B:
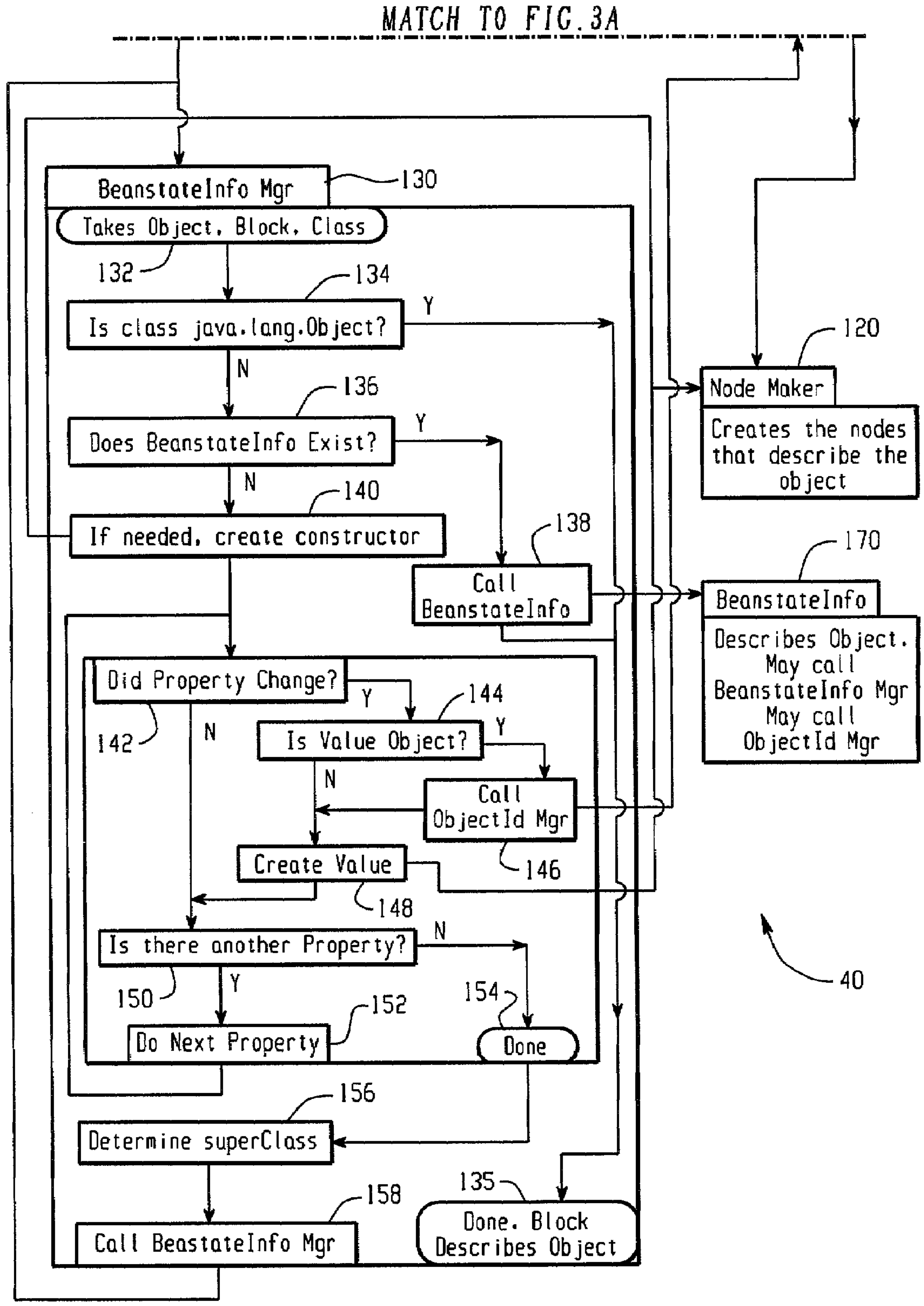

FIGS. 3A and 3B are flow diagrams that depict objects used to capture the state information of frame objects. The present invention may utilize different objects to determine and create the object state node tree. The ObjectId Manager 100 creates a block for an object. The BeanStateInfo Manager 130 obtains property data using such other objects as the BeanStateInfo 170. The Node Maker 120 creates nodes in the object state node tree.

The frame 34 is given to the ObjectId Manager 100 which takes an object to process at step 102. Step 104 of the ObjectID Manager 100 determines if the object has been created. Since it has not for this first pass, step 106 of the ObjectID Manager 100 creates a block node for insertion into the node tree by invoking the Node Maker 120. Step 108 determines the class of the object, and step 110 sends the frame 34 to the BeanStateInfo Manager 130 to determine the frame's state.

BeanStateInfo Manager 130 takes at step 132 the object currently being processed as well as the block created by the Node Maker 120 and the class determined by the ObjectID Manager at step 108. Step 134 examines whether the determined class corresponds to a java.lang.Object. If it does, then processing completes at step 135 for the BeanStateInfo Manager 130. However, if it does not, then step 136 examines whether BeanStateInfo exists for the object.

If BeanStateInfo does exist, then BeanStateInfo 170 is invoked at step 138. If there is BeanStateInfo, the BeanStateInfoManager allows the BeanStateInfo control to determine the state. A naming convention is used to discover if there is a BeanStateInfo implementation for a particular bean. Thus, the development environment can find a bean's associated BeanStateInfo implementation via pattern matching based upon the name of the bean. For example, the BeanStateInfo implementation for a bean called "MyButton" should be named "MyButtonBeanStateInfo". If a BeanStateInfo class exists for a given bean, then it is constructed and called to write out the state of the bean. The BeanStateInfo may call the BeanStateInfoManager, the ObjectId Manager, and/or the Node Maker to complete the process depending upon how the component designer has designed the bean and how the component designer has determined that the bean state information should be stored.

If the BeanStateInfoManager 130 does not find BeanStateInfo at step 136, a constructor node is created at step 140 by invoking the Node Maker 120. Step 142 examines whether any properties have changed. Step 142 determines whether the property has changed by comparing the object's present property value with the default property value given to the object when it is constructed. If a property value has changed but the property value is a primitive, string, or class as determined at step 144, then step 148 invokes the Node Maker 120 to create property nodes. If the property value is not a primitive, string, or class as determined at step 144, then the value's state is determined. Step 146 calls the ObjectId Manager 100 and provides the value to the ObjectId Manager 100. The ObjectId Manager 100 checks if the object has already been created, and if not, a block node is created and the BeanStateInfoManager 130 is called to determine the state.

Processing continues at steps 150 and 152 until all of the properties have been processed by the BeanStateInfo Manager 130. Step 156 determines the superClass of the object and step 158 invokes the BeanStateInfo Manager 130 in order to process the next object of the frame. The processing of the frame 34 continues until all of the frame objects' states are represented.

FIGS. 4A1, 4A2, 4B1 and 4B2 are object flow diagrams that depict an example of creating the beanstate information from objects. In this example, a frame was constructed in the development environment to hold a button. The frame has the following attributes:

Name: "patentExampleMain" (note that the developer has changed this property while in the development environment).

Layout: null (note that the developer has changed this property while in the development environment).

Foreground: (note that the developer has not changed this property while in the development environment).

Location: 0,0.

Size: 336×93.

Design-Time Information: To construct the frame at Design Time, the procedure com.sas.ide.IDESupport-.getFrameByName ("patentExampleMain") is invoked.

The frame's button has the following attributes:

Name: "button0" (note that the developer has changed this property while in the development environment).

Bounds: 14, 33, 75, 23 (note: the developer has changed this property while in the development environment; the first two parameters 14 and 33 specify where on the screen the top-left corner of the application window is to appear, and the last two parameters 75 and 23 indicate that the window will be 75 pixels wide and 23 pixels high).

Text: "Push Me" (note that the developer has changed this property while in the development environment).

With reference to FIGS. 4A1–4B2, the frame 34 is given to the ObjectId Manager 100A which processes the frame information. Step 200 of the ObjectID Manager 100A determines if the frame 34 has already been described. Since it has not for this first pass, step 202 of the ObjectID Manager 100A creates a block node for insertion into the node tree by invoking the Node Maker (not shown). The block to hold the frame information is named in this example "BuildFrame". The frame information is provided to the BeanStateInfo Manager 130A to determine the frame's state.

Because the BeanStateInfo does exist for the frame as determined at step 204, BuildFrame's BeanStateInfo 170A is invoked. The BuildFrame's BeanStateInfo 170A creates a DesignTime block at step 206 in order store the design time information associated with the frame. For this block, steps 208 and 210 create an assignment child of the DesignTime block so that the DesignTime block correctly reflects the proper invocation to build the frame in the development environment. For example, the DesignTime block may specify that the left-hand side of an assignment is BuildFrame, and that the right-hand side is the method "getFrameByName". After the DesignTime block has been created, it is added to the BuildFrame's block at step 212.

Step 214 obtains a list of properties of the frame. For this example, two frame properties are illustrated: layout and name. Since step 216 determines that the layout property has changed, step 218 creates within the BuildFrame block an assignment where the property layout is set as the left-hand side and the null value is set as the right-hand side of the assignment. Step 220 adds the layout assignment to the BuildFrame's Block.

Step 222 determines that the foreground property has not changed and thus processing continues at step 224. Step 224 determines that the name property has changed. Step 226 creates within the BuildFrame block an assignment where the name is set as the left-hand side and the "patentExample-Main" value is set as the right-hand side of the assignment. Step 228 adds the name assignment to the BuildFrame's Block.

A new block is created for the rectangle of the frame. Step 230 begins the process and step 232 obtains the rectangle's reference by invoking the ObjectId Manager 100B. Step 234 of the ObjectID Manager 100B determines that the rectangle object has not been described, and thus step 236 creates a block by invoking the BeanStateInfo Manager 130B. Step 238 determines that BeanStateInfo does exist for the rectangle, and steps 240 and 242 create an assignment that specifies that the rectangle's dimensions are 0, 0, 336, and 93. Step 246 adds the rectangle block with the assignment to the BuildFrame's Block. Step 248 returns the rectangle reference.

Steps 250 and 252 create a subsection within the BuildFrame block to call the method setBounds with the above rectangle as an argument. Steps 252 and 254 begin the process for creating the block for the button object within the frame (which creation is detailed on FIG. 4A2).

Step 260 gets the button reference which is provided to the ObjectId Manager 100C. The ObjectId Manager determines at step 262 that the button object has not been previously described. Step 264 indicates that a block needs to be created and invokes the BeanStateInfo Manager 130C.

BeanStateInfo Manager 130C determines that the BeanStateInfo does not exist and thus a constructor is needed. Step 268 creates an assignment for the button using a no-argument constructor (i.e., the default constructor). Step 270 obtains the list of properties of the button object. Step 272 determines that the name property has changed. Step 274 creates an assignment where the name is set as the left-hand side and the "button0" value is set as the right-hand side of the assignment. Step 276 adds the name assignment to the block.

Step 278 determines that the bounds property has changed. Since the property value is complex, the rectangle reference is obtained by invoking the ObjectId Manager 100D with the rectangle reference. Since the rectangle for the button has not already been described, a block is created by invoking the BeanStateInfo Manager 286. Step 288 determines that the BeanStateInfo exists for the rectangle and step 290 invokes the BeanStateInfo of the rectangle. Step 292 creates an assignment where the rectangle is set as the left-hand side and the bounds of the rectangle (14, 33, 75, 23) are set as the right-hand side of the assignment. Step 294 adds the assignment to the rectangle's block. Step 296 adds the rectangle's block to the button's block, and step 298 returns the rectangle reference.

Since the button needs to have the setbounds method use the button's rectangle as an argument, step 300 creates the assignment where bounds is the left-hand side and rectangle is the right-hand side. Step 302 adds the assignment to the button's block. Block 304 determines that the properties processing for the button have completed. Step 306 obtains the SuperClass for the button which is the "java.awt.Button".

Step 308 examines whether BeanStateInfo exists for "java.awt.Button". Since it does not, step 310 obtains the list of properties which includes the button text property. The property values are obtained by querying the JavaBean to obtain the state data. Step 312 determines that the text property has changed, and accordingly step 314 creates an assignment of the text value to reflect the changed value which is "Push Me". Step 316 adds the assignment to the button's block. Since step 318 determines that the properties for the button have been processed, step 320 obtains the SuperClass for the button. Step 322 determines that the Superclass is "java.lang.Object" which is the Java base class. Step 324 indicates that processing for the button has completed.

Step 326 adds the button's block to the BuildFrame's block, and the button reference is returned at step 328. Step 330 creates a block in order to call the add method on the BuildFrame that uses the button as an argument. Step 332 generates the add method call to the BuildFrame's block. Step 334 indicates that processing for the BuildFrame block has completed.

Figure 5A:
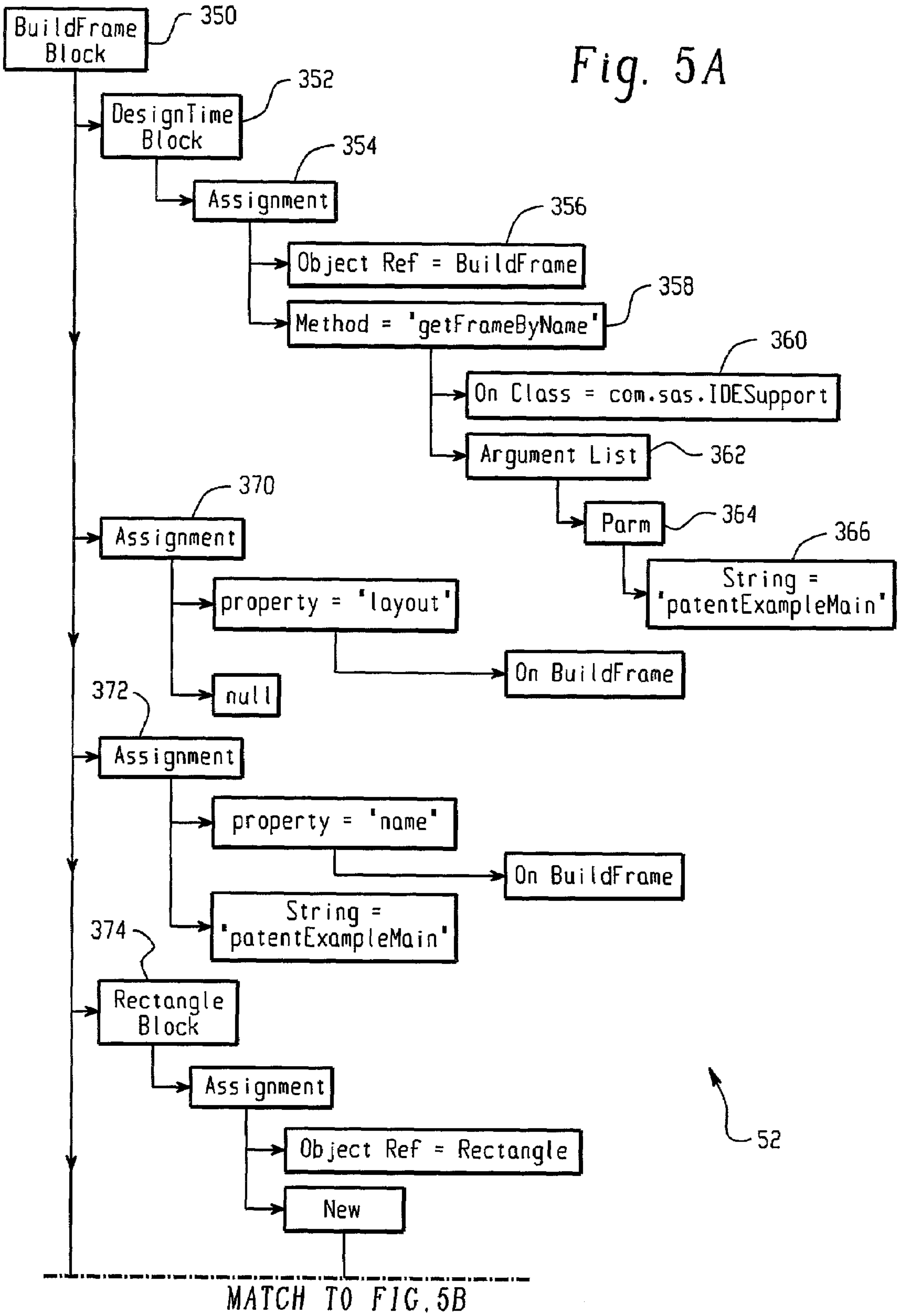
FIGS. 5A–5C are XML tree diagrams that depict an example of an XML tree diagram storing object state information.
Figure 5B:
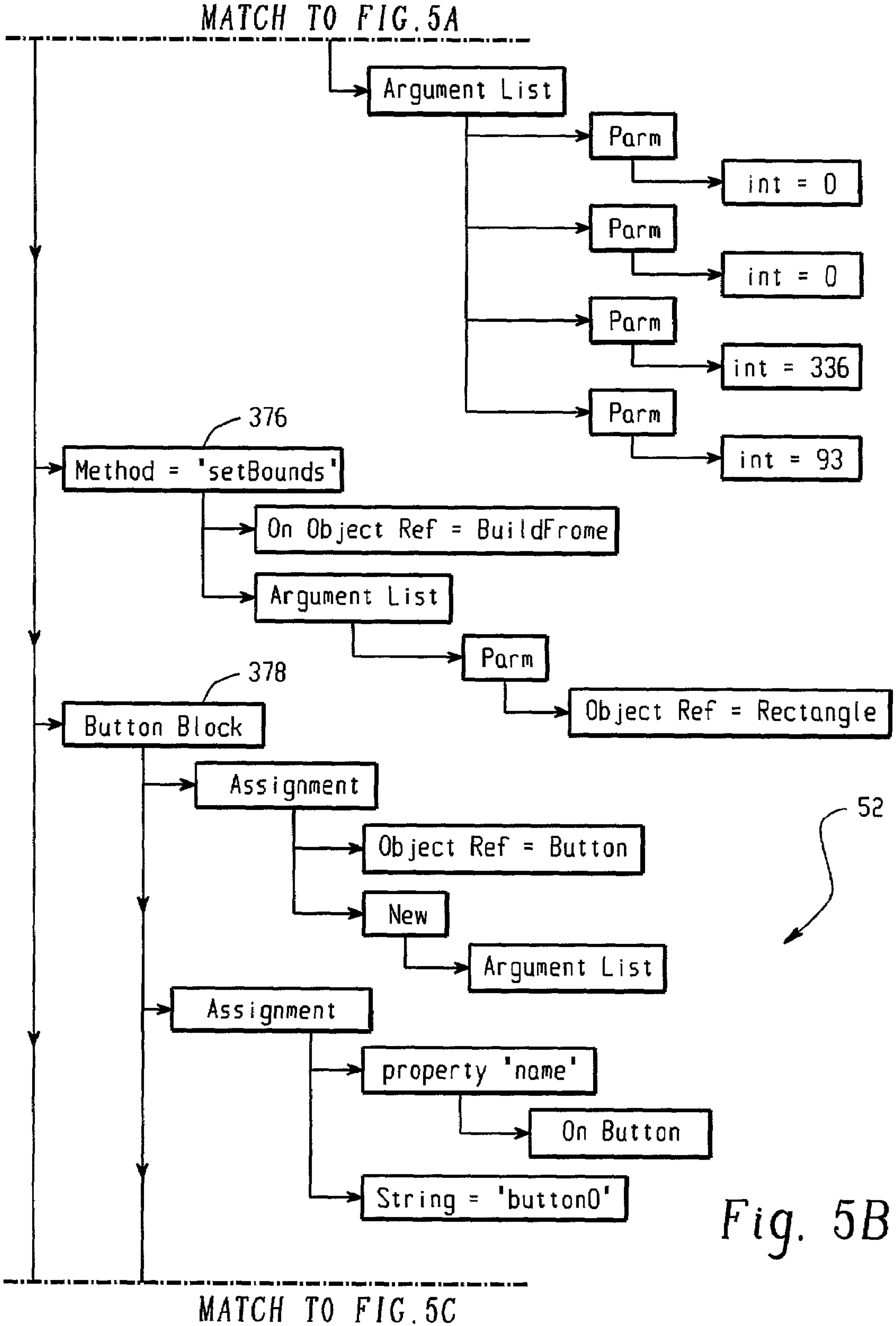
Figure 5C:
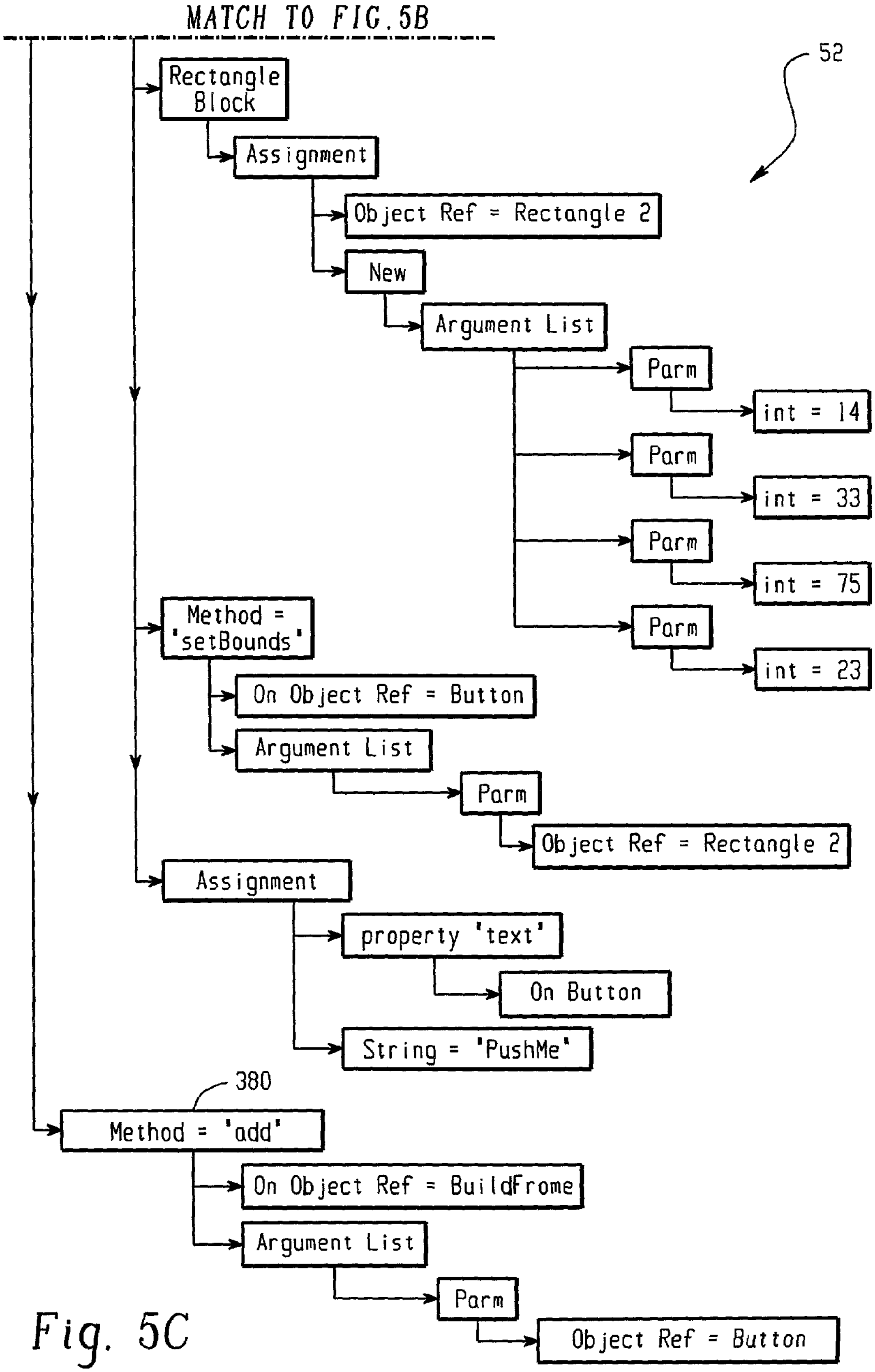

FIGS. 5A, 5B and 5C depict an XML tree diagram 52 resulting from the flowcharts of FIGS. 4A1–4B2. For example, step 206 of FIG. 4A1 created a DesignTime block at step 206 in order to store the design time information associated with the frame. Assignments were created for the DesignTime block. Accordingly, the XML tree of FIG. 5A contains a DesignTime block node 352 within the BuildFrame block node 350. The DesignTime block node 352 contains an assignment node 354 whose children 356 and 358 specify the assignment. The first child 356 of the assignment is the left-hand side (LHS) of the assignment. The second child 358 of the assignment is the right-hand side (RHS) of the assignment. Child 358 contains additional information in order to completely specify the object reference assignment at design time so that the 'com.sas.ide.IDESupport.getFrameByName("patentExampleMain")' may be called at design time to construct the frame. The first child node 360 of the method "getFrameByName" is its parent class. This method will be called on the class com.sas.IDESupport. The second child node 362 of this method is the argument list. The argument list node 362 specifies a parameter node 364 which contains a node 366 of String="patentExampleMain".

Similarly, the other blocks created by the flowcharts (of FIGS. 4A1–4B2) are shown as child nodes under the BuildFrame block 350. These include the layout assignment node 370, the name assignment node 372, the rectangle block node 374, the setbounds method node 376, the button block node 378, and the add method node 380.

FIGS. 6A–6C show XML tags 62 generated from the XML tree 52 of FIGS. 5A–5C. The tag elements of the XML 62 correspond to the nodes of the XML tree 52. For example, the BuildFrame block 350 (of FIG. 5A) corresponds to the XML block 400. The DesignTime Block 362 corresponds to the designTimeBlock tag 402. The tag's children are contained within tags 402 and 404. The designTimeBlock tag 402 contains an assignment tag 406 whose children specify the assignment. The first child tag 408 of the assignment tag 406 is the left-hand side (LHS) of the assignment. The first child tag 408 specifies the object class. The second child tag 410 of the assignment tag 406 is the right-hand side (RHS) and specifies the method name. An argumentList tag 414 contains a parameter tag 416 that specifies the argument's parameter type ("java.lang.String") and value ("patentExampleMain"). The design time block tags and run time block tags are examples of the present invention providing customization hooks so that JavaBeans may control how they are generated during design time or run time.

Similarly, the other XML tree nodes (of FIGS. 5A–5C) correspond to the other tags shown in FIGS. 6A–6C. These include the layout assignment node 370 corresponding to tag 420, the name assignment node 372 corresponding to tag 422, the rectangle block node 374 corresponding to tag 424, the setbounds method node 376 corresponding to tag 426, the button block node 378 corresponding to tag 428, and the add method node 380 corresponding to tag 430. In such a way, the XML tree is converted and stored in a text file as XML tags in order to persist the state and generation order of the objects.

Figure 7A:
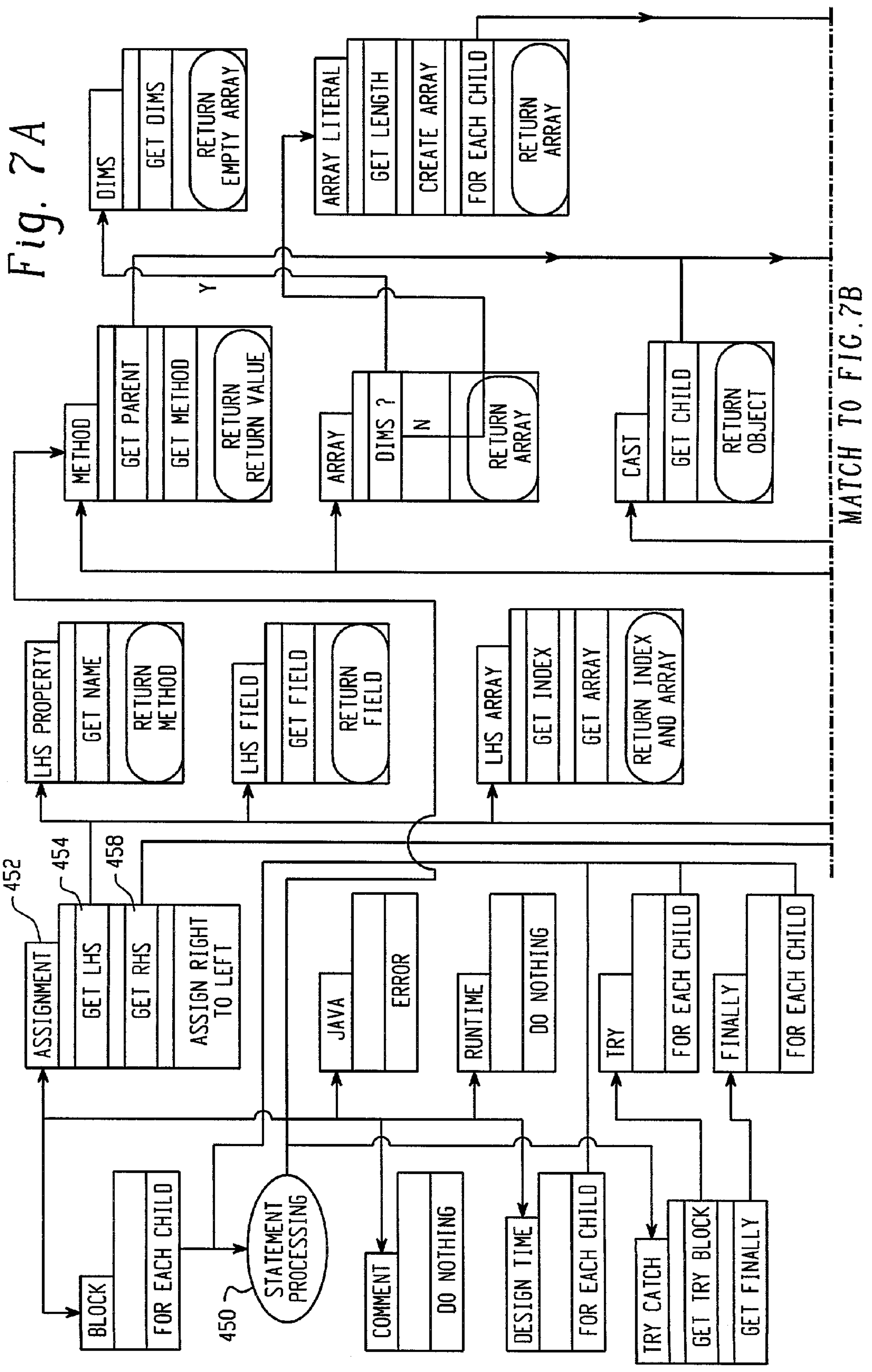
FIGS. 7A and 7B are flow diagrams that depict processor objects used to translate an XML tree into Java objects.
Figure 7B:
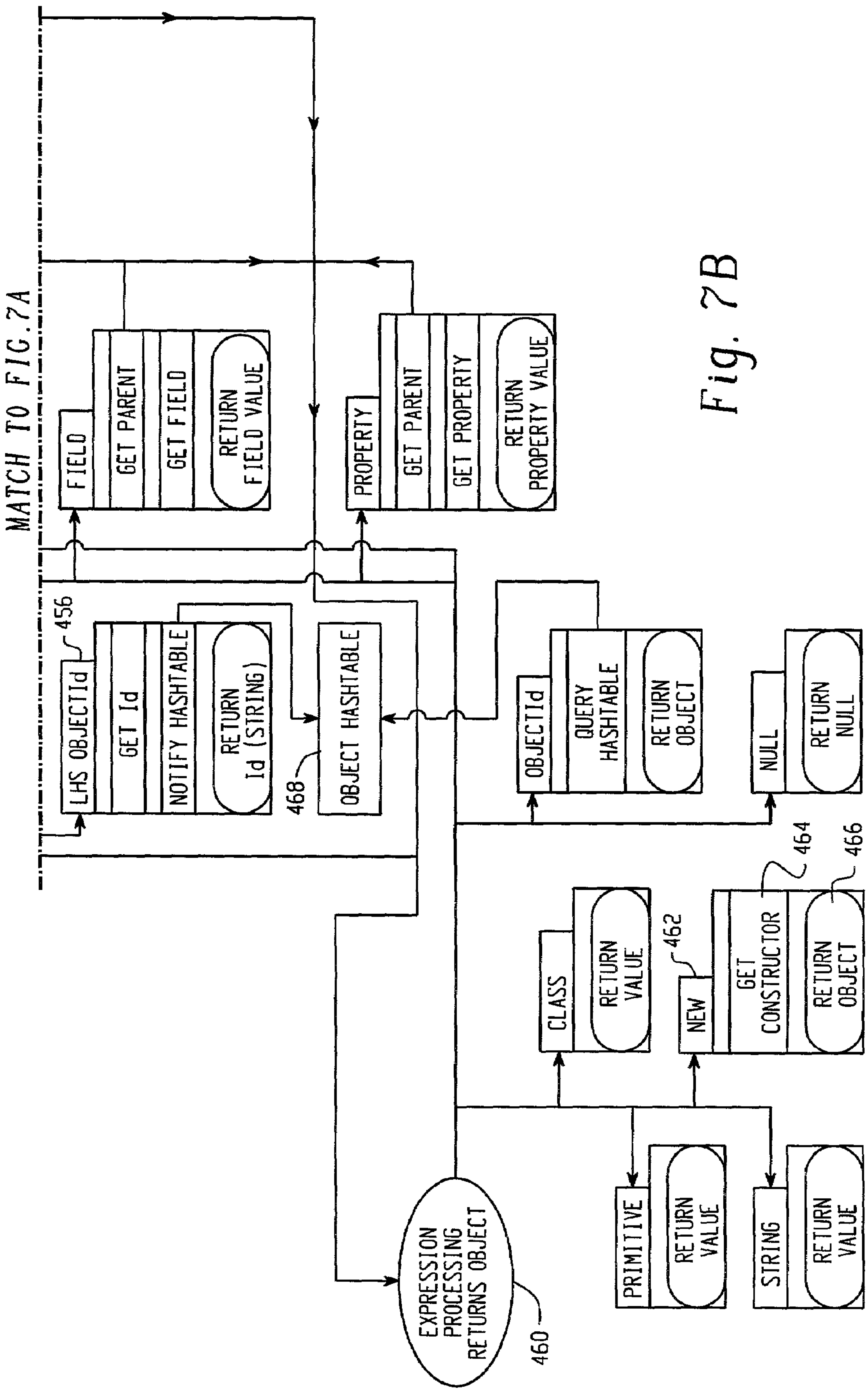

FIGS. 7A and 7B are flow diagrams that depict objects used to translate an XML tree into Java objects for use within a software development environment. The XML text file is read by the XML Parser to create the XML tree. The first tag in the tree is retrieved (which is a block tag). The block tag contains children tags. Each child tag is sent to the statement processor 450. The statement processor 450 checks the type of tag, and sends the tag to the proper processor. This process is continued until all tags are processed.

For example, the first tag in the block tag may be an assignment tag in which case the assignment processor 452 is invoked. The first child of the assignment tag is the left-hand side (LHS) of an assignment. Step 454 calls another object to process the LHS. If it is an object tag, the id is returned from the object tag processor 456.

The second child of the assignment tag is the right-hand side (RHS) side which step 458 sends to the expression processor 460. The expression processor 460 checks the tag type and forwards it to the tag's processor. The RHS tag may be a "new" tag. The new tag processor 462 at step 464 obtains the constructor name and signature and using Java introspection obtains ajava.lang.constructor. The constructor is invoked and a Java object is returned at step 464. The object is stored in the object hashtable 468.

Each child in the block is processed in this way until all tags have been processed. All objects are held in the object hashtable 468, with the frame being the first object. The frame is retrieved from the hashtable 468 and imported into WebAF, thereby completing the process of creating JavaBeans for use in a development environment.

Figure 8B:
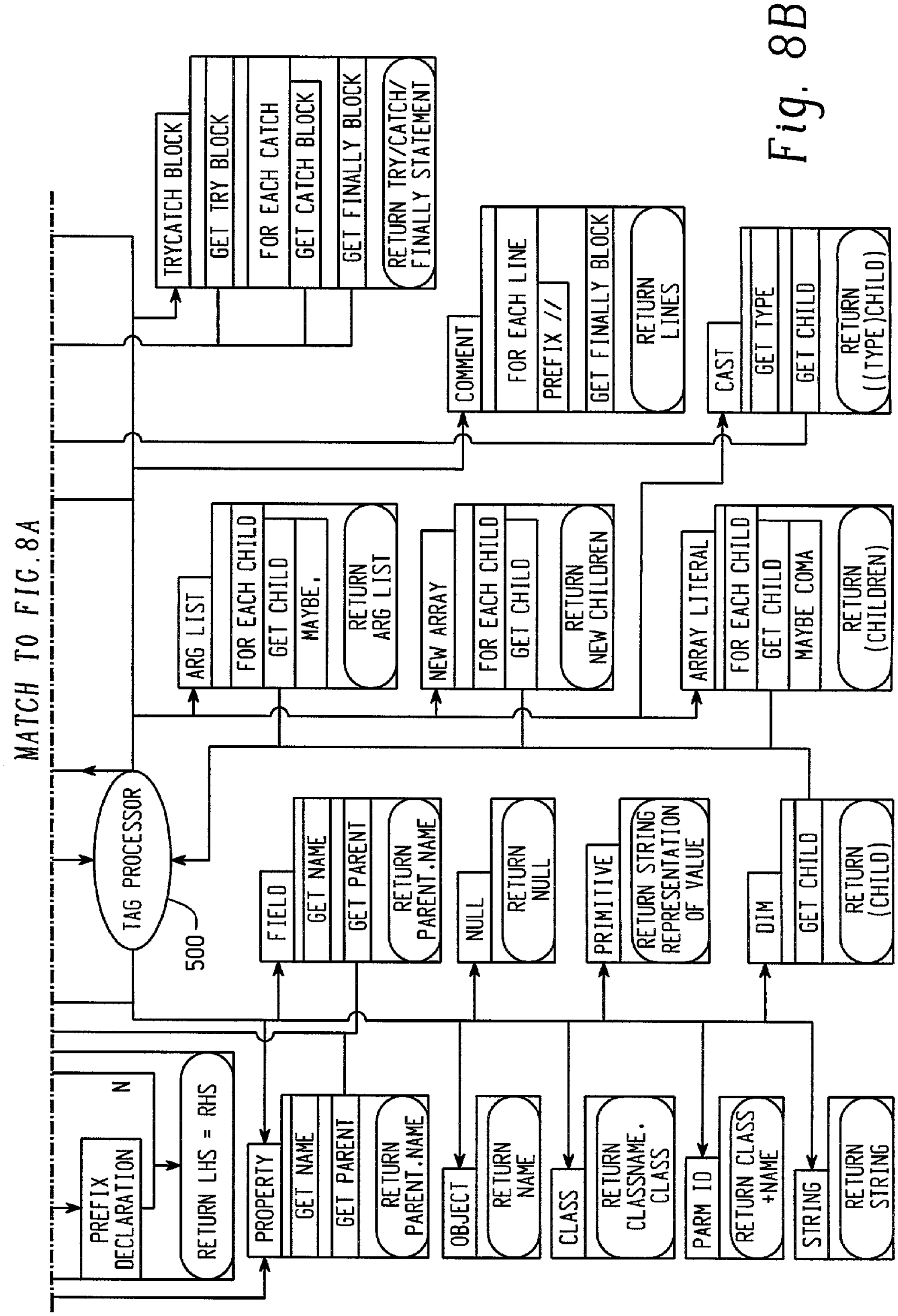

FIGS. 8A and 8B are flow diagrams that depict objects used to translate the XML tree into source code. The file is read in through the XML Parser to create the XML tree. To create code, the first tag is retrieved from the tree. The tag is sent to the tag processor 500, which checks the tag name and sends the tag to its proper processor. Each tag's processor creates a string that represents Java code to be used inside the main class. This process is continued until all tags have been converted into Java code.

For example, the first tag under a block tag may be an assignment. The assignment processor 502 processes the RHS (which is the second child tag of the assignment). The assignment tag processor 502 sends the second child tag to the tag processor 500. If the tag is a "new" tag, the new tag processor 504 gets the class type and then sends that tag's first child to the tag processor 500. Most likely the tag is an argument list tag. Each child of the argument list is processed through the tag processor 500. The argument list is returned to the new tag processor 504, which returns the class and argument list to the assignment tag processor 502.

Next, the assignment tag processor 502 processes the LHS. The first child tag is sent to the tag processor 500. If the tag is an object, the name is returned to the assignment tag processor 502. The assignment tag processor 502 checks to see if the object has been used before, and prefixes the classname to the LHS if it has not. The assignment tag processor 502 returns LHS=RHS to the tag processor 500, which writes out the Java code to the source file.

The preferred embodiments described herein are presented only to demonstrate an example of the invention. Additional and/or alternative embodiments of the invention would be apparent to one of ordinary skill in the art upon reading this disclosure. For example, the present invention uses Java code tags as additional customization hooks. Java code tags identify items that are to be written directly into source code. Typically, items that do not efficiently translate into a tag (such as, an assignment tag or other like tag) are translated into source code and stored in a Java code tag.

The invention claimed is:

1. A computer-implemented method for persisting private object state data created within an object development environment, comprising the steps of:

determining the private object state data of objects used within the object development environment;

wherein the objects are queried with respect to their private object state in order to determine the private object state data;

wherein the private state data is an object's internal state data, and public state data is data that can be retrieved via public method calls or public fields;

wherein a computer-readable file is in a human-understandable format;

determining whether the private object state data of the objects has been modified from initial values given to the objects upon the objects' creation;

storing in a computer-readable file the private object state data that has been determined to have been modified; and wherein the computer-readable file is in the human-understandable format, thereby allowing a text editing computer program to directly edit the computer-readable file;

restoring from the computer-readable file the private object state data that had been determined to have been modified.

2. The method of claim 1 wherein the human-understandable format is a text-based format.

3. The method of claim 1 further comprising the steps of:

after storing the determined private object state data in the computer-readable file, modifying the private object state data within the computer-readable file without using the object development environment; and restoring the stored private object state data by processing the computer-readable file, wherein the restored private object state data contains the modifications to the private object state data.

4. The method of claim 1 further comprising the steps of:

after storing the determined private object state data in the computer-readable file, directly editing the computer-readable file in order to modify the private object state data within the computer-readable file; and restoring the stored private object state data by processing the computer-readable file, wherein the restored private object state data contains the modifications to the private object state data.

5. The method of claim 1 wherein the modifications are to correct errors in object structure without using the object development environment.

6. The method of claim 1 wherein an object class that specifies structure of the private object state data has been modified, said modification occurring after the private object state data has been stored in the computer-readable file, said method further comprising the step of:

restoring the private object state data from the computer-readable file even though the object class has been modified.

7. The method of claim 1 wherein an object class that is included in the object development environment and that specifies structure of the private object state data has been modified, said modification occurring after the private object state data has been stored in the computer-readable file, said method further comprising the step of:

restoring back into the object development environment the private object state data from the computer-readable file despite the structures differing between the modified class and the private object state data.

8. The method of claim 1 further comprising the steps of:

determining public and the private object state data of the objects used within the object development environment;

storing the determined public and private object state data in the computer-readable file; and restoring the private and public object state data by processing the computer-readable file.

9. The method of claim 1 wherein the object development environment is a Java development environment.

10. The method of claim 1 wherein the object development environment is a Java development environment for providing graphical user interfaces.

11. The method of claim 1 further comprising the steps of:

determining that first private object state data is to be restored before second private object state data because of an interdependency between the first private object state data and the second private object state data;

generating the computer-readable file such that a restoration order is provided in the computer-readable file;

wherein the restoration order provided in the computer-readable file indicates that during restoration the first private object state data is to be restored before the second private object state data;

wherein the computer-readable file is in a structured format that indicates the restoration order in which the private object state data is to be restored.

12. The method of claim 11 further comprising the step of:

restoring the private object state data in the order specified by the structured format of the computer-readable file.

13. The method of claim 12 wherein the structured format is an XML structured format.

14. The method of claim 13 wherein the XML structured format includes nested XML blocks to indicate the order in which the private object state data is to be restored.

15. The method of claim 1 wherein the computer-readable file is in a structured format that contains private and public object state data.

16. The method of claim 1 further comprising the step of:

restoring into a different type of object development environment the private object state data from the computer-readable file.

17. The method of claim 16 wherein the computer-readable file has an XML structure such that the computer-readable file is configured for being imported both into the object development environment and the different type of object development environment.

18. The method of claim 16 further comprising the step of:

creating Java objects based upon the restored private object state data, wherein the Java objects are used within the object development environment.

19. The method of claim 16 further comprising the steps of:

creating Java objects based upon the restored private object state data;

storing the Java objects in an object hashtable; and retrieving a frame based upon the Java objects stored in the object hashtable.

20. The method of claim 1 further comprising the steps of:

restoring the private object state data by processing the computer-readable file; and using the restored private object state data to generate source code.

21. The method of claim 20 further comprising the step of:

using the restored private object state data to generate a different type of source code.

22. The method of claim 1 wherein the computer-readable file being in a human-understandable format allows for a user to modify object structures without having to reenter the object development environment.

23. The method of claim 1 further comprising the steps of:

determining customization hooks associated with the objects used within the object development environment;

storing the customization hooks in the computer-readable file; and restoring the customization hooks by processing the computer-readable file.

24. The method of claim 1 further comprising the steps of:

determining design time object state data associated with the objects used within the object development environment;

storing the design time object state data in the computer-readable file; and restoring the design time object state data by processing the computer-readable file, wherein the restored design time object state data is used during design time.

25. The method of claim 24 further comprising the steps of:

determining run time object state data associated with the objects used within the object development environment;

storing the run time object state data in the computer-readable file; and restoring the run time object state data by processing the computer-readable file, wherein the restored run time object state data is used during run time.

26. A computer-implemented method for persisting public and private object state data created within an object development environment, comprising the steps of:

generating a node tree whose nodes store the public and private object state data;

wherein the private state data is an object's internal state data;

wherein the public state data is data that can be retrieved via public method calls or public fields;

wherein an object is queried with respect to its private object state in order to determine the private object state data;

processing the nodes of the node tree to generate nodes in an XML tree, wherein the nodes in the XML tree correspond to an XML tag structure; and generating XML tags based upon the nodes in the XML tree, wherein the XML tags are structured so as to persist the public and private object state data;

wherein first private object state data is determined to be restored before second private object state data because of an interdependency between the first private object state data and the second private object state data;

wherein the XML tags are generated such that a restoration order is indicated;

wherein the restoration order indicates that during restoration the first private object state data is to be restored before the second private object state data.

27. The method of claim 26 further comprising the steps of:

parsing the XML tags to recover the public and private object state data;

instantiating objects based upon the recovered public and private object state data; and using the instantiated objects within the object development environment;

wherein the public state data is data that can be retrieved via public method calls or public fields;

wherein the private state data is an object's internal state data.

28. The method of claim 27 wherein the XML tags store design time object state data, said method further comprising the steps of:

parsing the XML tags to recover the design time object state data;

instantiating objects based upon the recovered design time object state data; and using the instantiated objects within the object development environment such that the recovered design time object state data is used only within the object development environment.

29. The method of claim 26 further comprising the steps of:

parsing the XML tags to recover the public and private object state data;

generating source code based upon the recovered public and private object state data; and using the generated source code to perform a computer operation.

30. The method of claim 26 wherein the public and private object state data comprise state data from JavaBeans.

31. The method of claim 26 wherein the XML tags are structured to store state restoration order for restoring objects, said method further comprising the steps of:

parsing the XML tags to recover the public and private object state data;

instantiating objects in an order based upon the stored state restoration order, wherein the instantiating of the object recovers the public and private object state data; and using the instantiated objects within the object development environment.

32. A computer-implemented apparatus for persisting private object state data created within an object development environment, comprising:

means for querying an object with respect to its private object state in order to determine private object state data;

wherein the private state data is the object's internal state data;

wherein public state data is data that can be retrieved via public method calls or public fields;

means for determining the private object state data of objects used within the object development environment;

means for determining that an interdependency exists between first private object state data and second private object state data;

means for determining that first private object state data is to be restored before second private object state data based upon the determination that an interdependency exists between the first private object state data and the second private state data;

means for storing the determined private object state data in a computer-readable file, wherein the computer-readable file is in a human-understandable format;

wherein the computer-readable file is generated such that a restoration order is provided in the computer-readable file;

means for restoring the private object state data by processing the computer-readable file.

33. The apparatus of claim 32 further comprising:

means for customizing the serialization of an object without requiring a change to the object.

34. The apparatus of claim 33 wherein the means for customizing the serialization of an object includes means for providing custom hooks for writing out state information of an object.

35. The apparatus of claim 33 wherein the means for customizing the serialization of an object includes BeanStateInfo object means for writing out state information of an object.

36. The apparatus of claim 32 further comprising:

means for serializing objects such that only properties that have not changed from their respective default values are written to the computer-readable file.

* * * * *